United States Patent [19]

Obama et al.

[11] Patent Number: 5,108,645
[45] Date of Patent: Apr. 28, 1992

[54] DETERGENT RESIN COMPOSITION

[75] Inventors: Kenjiro Obama; Kentaro Yamada; Hiroyuki Fujii, all of Ichiharashi, Japan

[73] Assignee: Chisso Corporation, Japan

[21] Appl. No.: 620,832

[22] Filed: Dec. 3, 1990

[30] Foreign Application Priority Data

Dec. 12, 1989 [JP] Japan ................... 1-322435

[51] Int. Cl.$^5$ .............................................. C11D 3/37
[52] U.S. Cl. .............................. 252/174.23; 252/558; 252/174.14; 252/DIG. 1; 134/7; 134/8; 134/22.17
[58] Field of Search ............... 252/558, 174.14, 174.23, 252/DIG. 1; 134/7, 8, 22.19

[56] References Cited

U.S. PATENT DOCUMENTS

| | | | |
|---|---|---|---|
| 4,838,945 | 6/1989 | Fujii et al. | 134/7 |
| 4,838,948 | 6/1989 | Bailey | 134/8 |
| 4,863,524 | 9/1989 | Komabashiri et al. | 134/22.19 |
| 4,904,309 | 2/1990 | Komabashiri et al. | 134/42 |

FOREIGN PATENT DOCUMENTS 0346956 12/1989 European Pat. Off. .

Primary Examiner—Paul Lieberman
Assistant Examiner—Mary DiNunzio
Attorney, Agent, or Firm—Leydig, Voit & Mayer

[57] ABSTRACT

A detergent resin composition is provided which is, in a small quantity, capable of very effectively deterging the inside of molding machines in a short period of time at the time of change-over of chlorine-containing resins inside the machines, which composition is obtained by blending 50 to 95% by weight of a polystyrene resin, 0.1 to 15% by weight of a polymethyl methacrylate, 2 to 30% by weight of a neutral salt of a sulfonic acid and 0.1 to 10% by weight of basic magnesium carbonate, magnesium hydroxide, aluminum hydroxide, zinc carbonate or a mixture thereof, the respective proportions being based upon the weight of the composition.

4 Claims, No Drawings

DETERGENT RESIN COMPOSITION

BACKGROUND OF THE INVENTION

1. Field of the Invention

This invention relates to a detergent resin composition used for deterging the inside of molding machines used for mold-processing vinyl chloride resin, vinylidene chloride resin, chlorinated polyethylene, etc.

More particularly it relates to a detergent resin composition having blended therein, a polystyrene resin, a polymethyl methacrylate resin and a neutral salt of sulfonic acid, each in a specified quantity, and further, basic magnesium carbonate, magnesium hydroxide, aluminum hydroxide or zinc carbonate or a mixture of two kinds or more thereof, in a specified quantity.

2. Description of the Related Art

In the mold-processing fields of plastics, production of more and more kinds of plastics each in a small quantity has been intended; thus the frequency of resin or color exchange inside molding machines has been increasing.

In particular, chlorine-containing polymers such as vinyl chloride resin, vinylidene chloride resin, chlorinated polyethylene, etc. are easily thermally decomposed and adhere to the inside of molding machines to form black or other colored pyrolyzed contaminants which adhere to the inner wall or screw of the molding machines; thus, a process of drawing out the resulting contaminated screw and brushing the screw and the inner wall of the cylinder of the molding machines has been employed. According to the process, however, a drawback exists in that a long time is required for completely deterging the inside of molding machines and hence the time loss is large. Thus, in order to solve these problems, various detergents for deterging the inside of molding machines have been developed. For example, a detergent, rust proof composition having an inorganic filler, a stabilizer and a lubricant blended in a vinyl chloride resin has been proposed (Japanese patent application laid-open No. Sho 60-110413). However, this detergent, rust proof composition has drawbacks that the composition is insufficient for removing the preceding chlorine-containing resins such as vinyl chloride resin, etc. adhered to the inner wall or screw of molding machines and is difficult to peel it off. Further, the vinyl chloride resin contained in the detergent, rust proof composition is thermally decomposed and remains inside the molding machines and the resulting burnt resin becomes a contaminant, which, in turn, contaminates the succeeding molded product.

SUMMARY OF THE INVENTION

The present inventors have made extensive research in order to obtain a resin composition for deterging the inside of molding machines usable for mold-processing various chlorine-containing resins such as vinyl chloride resin, in a small quantity of the composition used, in a simple operation and in a short time, without using as a detergent composition, a resin which remains inside molding machines and is thermally decomposed.

As a result, we have found that a composition having blended therein, a polystyrene resin, a polymethyl methacrylate resin and a neutral salt of a sulfonic acid, each in a specified quantity, and further basic magnesium carbonate, magnesium hydroxide, aluminum hydroxide, zinc carbonate or a mixture of two kinds or more thereof, in a specified quantity, is not thermally decomposed inside molding machines and exhibits a notably improved detergent effect.

The present invention resides in:

(1) A detergent resin composition having blended therein, 50 to 95% by weight of a polystyrene resin, 0.1 to 15% by weight of a polymethyl methacrylate, 2 to 30% by weight of a neutral salt of a sulfonic acid and 0.1 to 10% by weight of basic magnesium carbonate, magnesium hydroxide, aluminum hydroxide, zinc carbonate or a mixture thereof, the respective proportions being based upon the weight of said composition.

(2) A detergent resin composition according to item (1) wherein the polystyrene resin is at least one member selected from the group consisting of polystyrene, acrylonitrile-styrene resin, acrylonitrile-butadiene-styrene resin, methyl methacrylate-styrene resin and methyl methacrylate-butadiene-styrene resin.

(3) A detergent resin composition according to item (1) wherein said neutral salt of a sulfonic acid is sodium, calcium or magnesium salt of an alkylbenzenesulfonic acid, the alkyl group of which has 10 to 18 carbon atoms, or sodium salt of an alkylmethyltaurine, the alkyl group in which has 10 to 18 carbon atoms.

(4) A detergent resin composition according to item (1) obtained by melt-kneading and molding into pellet form.

DETAILED DESCRIPTION OF PREFERRED EMBODIMENTS

Examples of the polystyrene resin used in the present invention are styrene homopolymer, polymethyl-styrene, block copolymer of styrene with butadiene or isoprene, acrylonitrile-styrene resin (hereinafter referred to as AS resin) acrylonitrile-butadiene-styrene resin (hereinafter referred to as ABS resin), methyl methacrylate-styrene resin (hereinafter referred to as MS resin), methyl methacrylate-butadiene-styrene resin (hereinafter referred to as MBS resin), these being used alone or in admixture, and the quantity thereof blended being 50 to 95% by weight based upon the weight of the composition. If the quantity thereof blended is less than 50% by weight, the fluidity of the resulting detergent resin composition when melted is too high and makes it difficult to peel off the preceding resin adhered onto the inside of the molding machine, while if the quantity thereof blended exceeds 95% by weight, the quantity of other components is reduced so that the detergent capacity of the resulting detergent resin composition is lowered.

Examples of the polymethyl methacrylate used in the present invention are methyl methacrylate homopolymer, and besides, copolymers of methyl methacrylate with butyl methacrylate, 2-ethylhexyl methacrylate, butyl acrylate, 2-ethylhexyl acrylate, etc. The quantity thereof used is 0.1 to 15% by weight based upon the weight of the composition. If it is less than 0.1% by weight, it is difficult to peel off the preceding resin adhered as a contaminant to the inner wall or screw of molding machines from the wall or screw, while if it exceeds 15% by weight, the polymethyl methacrylate mixes in the succeeding resin to form a contaminant on the surface of the resulting molded product.

Examples of the neutral salt of a sulfonic acid used in the present invention are sodium, calcium or magnesium salt of an alkylbenzenesulfonic acid (the alkyl group having 10 to 18 carbon atoms) or sodium salt of an alkylmethyltaurine (the alkyl group having 10 to 18 carbon atoms), these being used alone or in admixture.

The quantity of the neutral salt of a sulfonic acid used is 2 to 30% by weight based upon the weight of the composition. If the quantity thereof used is less than 2% by weight, the detergent capacity is inferior, while if it exceeds 30% by weight, the fluidity of the resulting detergent resin composition when melted is too good so that it is difficult to peel off the preceding resin adhered to the inside of molding machines and the detergency is reduced.

Further, the quantity of the basic magnesium carbonate, magnesium hydroxide, aluminum hydroxide, zinc carbonate or mixtures of two or more kinds thereof used is 0.1 to 10% by weight based upon the weight of the composition. If the quantity is less than 0.1% by weight, the detergent effect of the resulting detergent resin composition is small, while if it exceeds 10% by weight, when the inside of molding machines is deterged with the detergent resin composition, followed by molding with the succeeding resin, the molded product from the succeeding resin becomes translucent.

To the detergent resin composition of the present invention may be added metal soaps such as magnesium stearate, calcium stearate, zinc stearate, etc., heat stabilizers such as bisphenol A, dibutyltin maleate, etc., anionic surfactants such as sodium alkylester sulfates, sodium α-olefinsulfonates, etc., plasticizers such as dioctyl phthalate, epoxy soybean oil, etc.

The composition of the present invention can be obtained by mixing specified quantities of a polystyrene resin, a polymethyl methacrylate, a neutral salt of a sulfonic acid and further, basic magnesium carbonate, magnesium hydroxide, aluminum hydroxide or zinc carbonate or a mixture of two or more kinds thereof, or it can also be obtained by filling the composition mixed in advance in a hopper of an extruder, followed by melt-knead-extruding the composition at a temperature of 140° to 250° C. and cutting the extruded strand into pellets. The mixing may be carried out by means of a conventional mixer such as Henschel mixer (tradename), super mixer, ribbon blender, tumbler mixer, etc. Further, as the extruder, a single-screw extruder, twin-screw extruder, Ko-kneader (tradename), etc. may be employed. As the cutting process for granulation, any of underwater cutting, cutting in mist or cutting in air may be employed.

EXAMPLE

The present invention will be described in more detail, but it should not be construed to be limited thereto.

In addition, the detergent test employed in Examples and Comparative examples was carried out according to the following method:

DETERGENT TEST

A colored resin (150 g) was melt-knead-extruded by means of a single-screw extruder (cylinder diameter: 20 mm and L/D=22), followed by feeding a detergent resin composition (200 g) according to the present invention into the extruder, melt-knead-extruding it, successively feeding a non-colored detergent resin, continuing melt-knead-extrusion, and measuring the quantity of the detergent resin required by the time when the extrudate of the detergent resin was not colored and the time having elapsed since the feed of the detergent resin composition was started until the extrudate of the detergent resin was not colored.

EXAMPLE 1

A polystyrene resin (a homopolymer of a melt flow index (JIS K 6870: 200° C., 5 Kgf) of 1.0 g/10 min.) (3.60 Kg), a polymethyl methacrylate (METABLEN® P531 made by Mitsubishi Rayon Co., Ltd.) (0.60 Kg), sodium dodecylbenzenesulfonate (0.40 Kg), basic magnesium carbonate (0.30 Kg), a polyethylene wax (number average molecular weight: 1,500) (0.05 Kg) and magnesium stearate (0.05 Kg) were mixed with stirring at a revolution number of 500 rpm for 3 minutes by means of a 20 l capacity Henschel mixer (tradename).

The resulting mixture was fed into a twin-screw extruder (L/D: 30, cylinder diameter: 30 mm), followed by melt-knead-extruding it under conditions of a cylinder temperature of 200° C. and a die temperature of 210° C., cooling the extrudate in a water bath and cutting it by means of a pelletizer to obtain a translucent detergent resin composition. Using this detergent resin composition, a detergent test of an extruder contaminated with a rigid vinyl chloride resin (polymerization degree: 700) containing 1% by weight of carbon black was carried out.

Further, a transparent rigid vinyl chloride resin (polymerization degree: 700) was used as a detergent resin at a cylinder temperature of the extruder of 180° C. The quantity of the transparent rigid vinyl chloride resin consumed was 100 g and the time required for the deterging was 12 minutes.

EXAMPLE 2

An MBS resin (KUREHA BTA X2 (tradename) made by Kureha Chemical Industry Co., Ltd.) (3.53 Kg), a polymethyl methacrylate® P531 made by Mitsubishi Rayon Co., Ltd.) (0.15 Kg), magnesium dodecylbenzenesulfonate (0.75 Kg), basic magnesium carbonate (0.40 Kg), a polyethylene wax (number average molecular weight: 1,500) (0.12 Kg) and calcium stearate (0.05 Kg) were mixed in the same manner as in Example 1 followed by repeating Example 1 except that a cylinder temperature of 190° C. and a die temperature of 200° C. were employed, to obtain a detergent resin composition. Using this composition, a detergent test was carried out in the same manner as in Example 1.

The quantity of the transparent rigid vinyl chloride resin as a detergent resin consumed was 60 g and the time required for the deterging was 10 minutes.

EXAMPLE 3

An MS resin (JSR MS320 (tradename) made by Japan Synthetic Rubber Co., Ltd.) (3.17 Kg), a polymethyl methacrylate (METABLEN® P531 made by Mitsubishi Rayon Co., Ltd.) (0.50 Kg), sodium dodecylmethyltaurinate (1.10 Kg), basic magnesium carbonate (0.08 Kg), magnesium stearate (0.06 Kg) and calcium stearate (0.09 Kg) were mixed in the same manner as in Example 1, followed by repeating Example 1 except that a cylinder temperature of 210° C. and a die temperature of 220° C. were employed, to obtain a detergent resin composition. Using this composition, a detergent test was carried out in the same manner as in Example 1. The quantity of the transparent rigid vinyl chloride resin as a detergent resin consumed was 80 g and the time required for the deterging was 11 minutes.

EXAMPLE 4

A polystyrene (a homopolymer of a melt flow index (JIS K6870: 200° C., 5 Kgf) of 1.8 g/10 min.) (4.06 Kg), a polymethyl methacrylate (METABLEN® P531 made by Mitsubishi Rayon Co., Ltd.) (0.40 Kg), magnesium dodecylbenzenesulfonate (0.20 Kg), basic magnesium carbonate (0.20 Kg) and a polyethylene wax (number average molecular weight: 1,500) (0.14 Kg) were mixed and extruded in the same manner as in Example 1 to obtain a detergent resin composition. Using this detergent resin composition, a detergent test of the extruder contaminated with a vinylidene chloride resin (SARAN® made by Asahi Chemical Industry Co., Ltd.) having 1% by weight of carbon black mixed therein was carried out. A cylinder temperature of the extruder of 170° C. was employed and a non-colored vinylidene resin (SARAN® made by Asahi Chemical Industry Co., Ltd.) was used as a detergent resin. The quantity of the non-colored vinylidene chloride resin consumed was 160 g and the time required for the deterging was 15 minutes.

EXAMPLE 5

A polystyrene (a homopolymer of a melt flow index (JIS K 6870: 200° C., 5 Kgf) of 5.2 g/10 min.) (3.75 Kg), a polymethyl methacrylate (METABLEN® P531 made by Mitsubishi Rayon Co., Ltd.) (0.03 Kg), calcium dodecylbenzenesulfonate (0.60 Kg) basic magnesium carbonate (0.47 Kg), a polyethylene wax (number average molecular weight: 1,500) (0.09 Kg) and magnesium stearate (0.06 Kg) were mixed and extruded in the same manner as in Example 1 to obtain a detergent resin composition.

Using this composition, a detergent test of the extruder contaminated with a chlorinated polyethylene (DAISOLAC® G-245 made by DAISO Co., Ltd.) having 1% by weight of carbon black added thereto was carried out. A cylinder temperature of the extruder of 170° C. was employed and a non-colored chlorinated polyethylene (DAISOLAC® G-245 made by DAISO Co., Ltd.) was used as a detergent resin. The quantity of the non-colored chlorinated polyethylene consumed was 120 g and the time required for the deterging was 13 minutes.

EXAMPLE 6

An AS resin (a melt flow rate (JIS K 7210: 220° C./10 Kgf) of 23 g/10 min.) (3.60 Kg), a polymethyl methacrylate (METABLEN® P550 made by Mitsubishi Rayon Co., Ltd.) (0.60 Kg), magnesium dodecylbenzenesulfonate (0.40 Kg), basic magnesium carbonate (0.30 Kg) and calcium stearate (0.10 Kg) were mixed in the same manner as in Example 1, followed by repeating Example 1 except that a cylinder temperature of 210° C. and a die temperature of 220° C. were employed, to obtain a detergent resin composition.

Using this detergent resin composition, a detergent test was carried out in the same manner as in Example 1. The quantity of a transparent rigid vinyl chloride resin as a detergent resin consumed was 110 g and the time required for the deterging was 13 minutes.

EXAMPLE 7

An ABS resin (a melt flow rate (JIS K 7210: 220° C./10 Kgf) of 35 g/10 min.) (4.06 Kg), a polymethyl methacrylate (METABLEN® P550 made by Mitsubishi Rayon Co., Ltd.) (0.40 Kg), magnesium dodecylbenzenesulfonate (0.20 Kg), basic magnesium carbonate (0.20 Kg) and a polyethylene wax (number average molecular weight: 1,500) (0.14 Kg) were mixed in the same manner as in Example 1, followed by repeating Example 1 except that a cylinder temperature of 220° C. and a die temperature of 220° C. were employed, to obtain a detergent resin composition. Using this detergent resin composition, a detergent test was carried out in the same manner as in Example 1. The quantity of a transparent rigid vinyl chloride resin as a detergent resin consumed was 90 g and the time required for the deterging was 12 minutes.

EXAMPLE 8

An MS resin (JSR MS 320 (tradename) made by Japan Synthetic Rubber Co., Ltd.) (3.36 Kg), a polymethyl methacrylate (METABLEN® P550 made by Mitsubishi Rayon Co., Ltd.) (0.30 Kg), sodium salt of dodecylmethyl taurine (0.80 Kg), magnesium hydroxide (0.40 Kg) and a polyethylene wax (number average molecular weight: 1,500) (0.14 Kg) were mixed in the same manner as in Example 1, followed by repeating Example 1 except that a cylinder temperature of 210° C. and a die temperature of 220° C. were employed, to obtain a detergent resin composition. Using this composition, a detergent test was carried out in the same manner as in Example 1.

The quantity of a transparent rigid vinyl chloride resin as a detergent resin consumed was 90 g and the time required for the deterging was 12 minutes.

EXAMPLE 9

A polystyrene (a homopolymer having a melt flow index (JIS K 6870: 200° C., 5 Kgf) of 1.8 g/10 min.) (3.65 Kg), a polymethyl methacrylate (METABLEN® P550 made by Mitsubishi Rayon Co., Ltd.) (0.40 Kg), sodium salt of dodecylmethyl taurine (0.50 Kg), aluminum hydroxide (0.30 Kg), a polyethylene wax (number average molecular weight: 1,500) (0.09 Kg) and magnesium stearate (0.06 Kg) were mixed and extruded in the same manner as in Example 1 to obtain a detergent resin composition. Using this composition, a detergent test was carried out in the same manner as in Example 1.

The quantity of a transparent rigid vinyl chloride resin as a detergent resin consumed was 110 g and the time required for the deterging was 13 minutes.

EXAMPLE 10

An AS resin (melt flow rate (JIS K 7210: 220° C./10 Kgf): 23 g/10 min.) (3.55 Kg), a polymethyl methacrylate (METABLEN® P550 made by Mitsubishi Rayon Co., Ltd.) (0.50 Kg), sodium salt of dodecylmethyl taurine (0.40 Kg), basic magnesium carbonate (0.20 Kg), zinc carbonate (0.20 Kg), magnesium stearate (0.06 Kg) and calcium stearate (0.09 Kg) were mixed in the same manner as in Example 1, followed by repeating Example 1 except that a cylinder temperature of 210° C. and a die temperature of 220° C. were employed, to obtain a detergent resin composition. Using this composition, a detergent test was carried out. The quantity of a transparent rigid vinyl chloride resin as a detergent resin consumed was 120 g and the time required for the deterging was 13 minutes.

COMPARATIVE EXAMPLE 1

A polyethylene (a homopolymer having a melt flow index (JIS K 6870: 200° C., 5 Kgf) of 1.0 g/10 min.) (4.20 Kg), sodium dodecylbenzenesulfonate (0.40 Kg), basic magnesium carbonate (0.30 Kg), a polyethylene wax (number average molecular weight: 1,500) (0.05 Kg) and magnesium stearate (0.05 Kg) were mixed and extruded in the same manner as in Example 1 to obtain a detergent resin composition. Using this composition, a detergent test was carried out in the same manner as in Example 1. The quantity of a transparent rigid vinyl chloride resin as a detergent resin was 380 g and the time required for the deterging was 26 minutes.

COMPARATIVE EXAMPLE 2

A vinyl chloride resin (a homopolymer having a polymerization degree of 1,000) (3.85 Kg), calcium carbonate (0.77 Kg), tribasic lead sulfate (0.23 Kg) and dibasic lead stearate (0.15 Kg) were mixed with stirring by means of a 20 l capacity high-speed mixer at a revolution number of 500 rpm for 3 minutes.

This mixture was fed into a single-screw extruder (L/D: 22 and cylinder diameter: 40 mm) and extruded into a strand form under conditions of a cylinder temperature and a die temperature each of 180° C., to obtain a granular detergent resin composition.

Using this composition, a detergent test was carried out in the same manner as in Example 1. The quantity of a transparent rigid vinyl chloride resin as a detergent resin consumed was 840 g and the time required for the deterging was 48 minutes.

Conditions and results of Examples 1–10 and Comparative examples 1–2 are collectively shown in Table 1.

consumed and shorten the detergent time as compared with the case where conventional detergent compositions are changed over.

For example, in the case where kinds of vinyl chloride resin are changed over, it is possible to reduce the quantity of the succeeding detergent resin consumed when the composition of the present invention is used, down to 1/7 or less and shorten the time required for deterging, down to ⅓ or less as compared with the case where conventional detergent resin compositions obtained by blending an inorganic filler and a stabilizer into vinyl chloride resin.

What we claim is:

1. A detergent resin composition having blended therein, 50 to 95% by weight of a polystyrene resin, 0.1 to 15% by weight of a polymethyl methacrylate, 2 to 30% by weight of a neutral salt of a sulfonic acid and 0.1 to 10% by weight of an inorganic compound selected from the group consisting of basic magnesium carbonate, magnesium hydroxide, aluminum hydroxide, zinc carbonate and mixtures thereof, the respective proportions being based upon the weight of said composition.

2. A detergent resin composition according to claim 1 wherein said polystyrene resin is at least one member selected from the group consisting of polystyrene, acrylonitrile-styrene resin, acrylonitrile-butadiene-sty-

TABLE 1

| Item | Ex. 1 | Ex. 2 | Ex. 3 | Ex. 4 | Ex. 5 | Ex. 6 | Ex. 7 | Ex. 8 | Ex. 9 | Ex. 10 | Comp. ex. 1 | Comp. ex. 2 |
|---|---|---|---|---|---|---|---|---|---|---|---|---|
| Blending (wt. %) | | | | | | | | | | | | |
| Polystyrene | 72.0 | — | — | 81.2 | 75.0 | — | — | — | 73.0 | — | 84.0 | — |
| MBS resin | — | 70.6 | — | — | — | — | — | — | — | — | — | — |
| ABS resin | — | — | — | — | — | — | 81.2 | — | — | — | — | — |
| MS resin | — | — | 63.4 | — | — | — | — | 67.2 | — | — | — | — |
| AS resin | — | — | — | — | — | 72.0 | — | — | — | 71.0 | — | — |
| PVC | — | — | — | — | — | — | — | — | — | — | — | 77.0 |
| MMA resin | 12.0 | 3.0 | 10.0 | 8.0 | 0.6 | 12.0 | 8.0 | 6.0 | 8.0 | 10.0 | — | — |
| Neutral salt of alkylbenzene-sulfonic acid | 8.0 | 15.0 | — | 4.0 | 12.0 | 8.0 | 4.0 | — | — | — | 8.0 | — |
| Neutral salt of alkylmethyl-taurine | — | — | 22.0 | — | — | — | — | 16.0 | 10.0 | 8.0 | — | — |
| Basic magnesium carbonate | 6.0 | 8.0 | 1.6 | 4.0 | 9.4 | 6.0 | 4.0 | — | — | 4.0 | 6.0 | — |
| Mg(OH)$_2$ | — | — | — | — | — | — | — | 8.0 | — | — | — | — |
| Al(OH)$_3$ | — | — | — | — | — | — | — | — | 6.0 | — | — | — |
| ZnCO$_3$ | — | — | — | — | — | — | — | — | — | 4.0 | — | — |
| PE-WAX | 1.0 | 2.4 | — | 2.8 | 1.8 | — | 2.8 | 2.8 | 1.8 | — | 1.0 | — |
| Mg stearate | 1.0 | — | 1.2 | — | 1.2 | — | — | — | 1.2 | 1.2 | 1.0 | — |
| Ca stearate | — | 1.0 | 1.8 | — | — | 2.0 | — | — | — | 1.8 | — | — |
| CaCO$_3$ | — | — | — | — | — | — | — | — | — | — | — | 15.4 |
| Tribasic lead sulfate | — | — | — | — | — | — | — | — | — | — | — | 4.6 |
| Dibasic lead stearate | — | — | — | — | — | — | — | — | — | — | — | 3.0 |
| Detergent test | | | | | | | | | | | | |
| Preceding resin | Black PVC | Black PVC | Black PVC | Black PVDC | Black Cl-PE | Black PVC | Black PVC | Black PVC | Black PVC | Black PVC | Black PVC | Black PVC |
| Detergent resin | PVC | PVC | PVC | PVDC | Cl-PE | PVC | PVC | PVC | PVC | PVC | PVC | PVC |
| Quantity of detergent resin required (g) | 100 | 60 | 80 | 160 | 120 | 110 | 90 | 110 | 90 | 120 | 380 | 840 |
| Required time (min) | 12 | 10 | 11 | 15 | 13 | 13 | 12 | 13 | 12 | 13 | 26 | 48 |

EFFECTIVENESS OF THE INVENTION

By using the detergent resin composition of the present invention, it is possible to very effectively deterge the inside of molding machines when kinds of chlorine-containing resins such as vinyl chloride resin, vinylidene chloride resin, chlorinated polyethylene, etc. are changed over.

Namely, by using the resin composition of the present invention in a small quantity, it is possible to notably reduce the quantity of the succeeding detergent resin rene resin, methyl methacrylate-styrene resin and methyl methacrylate-butadiene-styrene resin.

3. A detergent resin composition according to claim 1 wherein said neutral salt of a sulfonic acid is sodium, calcium or magnesium salt of an alkylbenzenesulfonic acid or sodium salt of an alkylmethyltaurine, the alkyl group in said neutral salt having 10 to 18 carbon atoms.

4. A detergent resin composition according to claim 1 obtained by melt-kneading and molding into pellet form.

* * * * *